United States Patent
Nakamura

(10) Patent No.: US 9,004,128 B2
(45) Date of Patent: Apr. 14, 2015

(54) STEEL CORD FOR REINFORCING RUBBER ARTICLE AND PNEUMATIC TIRE

(75) Inventor: Keisuke Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 231 days.

(21) Appl. No.: 13/145,073

(22) PCT Filed: Jan. 19, 2010

(86) PCT No.: PCT/JP2010/050568
§ 371 (c)(1),
(2), (4) Date: Aug. 12, 2011

(87) PCT Pub. No.: WO2010/082666
PCT Pub. Date: Jul. 22, 2010

(65) Prior Publication Data
US 2011/0284144 A1    Nov. 24, 2011

(30) Foreign Application Priority Data
Jan. 19, 2009    (JP) ................. 2009-008963

(51) Int. Cl.
*B60C 9/18*    (2006.01)
*D02G 3/48*    (2006.01)
*B60C 9/00*    (2006.01)
(Continued)

(52) U.S. Cl.
CPC ............ *D07B 1/0613* (2013.01); *B60C 9/0007* (2013.01); *B60C 9/2006* (2013.01); *B60C 2200/06* (2013.01); *D07B 1/0626* (2013.01); *D07B 1/0633* (2013.01); *D07B 2201/2097* (2013.01); *D07B 2205/3057* (2013.01); *D07B 2501/2046* (2013.01); *D07B 2801/10* (2013.01);
(Continued)

(58) Field of Classification Search
None
See application file for complete search history.

(56) References Cited

U.S. PATENT DOCUMENTS 3,035,403 A * 5/1962 Grimes, Jr. et al. ............. 57/214
4,005,610 A    2/1977 Simonsen et al.
(Continued)

FOREIGN PATENT DOCUMENTS

CN    1457378 A    11/2003
GB    2031042    *  4/1980
(Continued)

OTHER PUBLICATIONS
Machine translation of JP 2002-30586, 2002.*
(Continued)

*Primary Examiner* — Justin Fischer
(74) *Attorney, Agent, or Firm* — Sughrue Mion, PLLC

(57) ABSTRACT

Without decreasing the strength in the axial direction of the cord, and without increasing the thickness in the radial direction, a steel cord for reinforcing a rubber article, which improves durability against cut, as well as a construction vehicle tire utilizing the steel cord for reinforcing a rubber article as a reinforcing material is provided.

A steel cord for reinforcing a rubber article is formed by twisting a plurality of sheath strands 2 formed by twisting a plurality of wires around a core strand 1 formed by twisting a plurality of wires, wherein the core strand 1 is constituted of a 4-layer-twisted structure and the diameter of the steel cord is 5 mm or larger. The tire of the present invention is a tire which has a belt constituted with 6 belt plies with cords arrayed on the outer side in the radial direction of the tire at a crown part of the carcass, which are crossed between the laminated plies, and wherein the steel cords for reinforcing a rubber article are applied to the third belt layer and the fourth belt layer.

3 Claims, 3 Drawing Sheets

(51) Int. Cl.
  *B60C 9/20* (2006.01)
  *D07B 1/06* (2006.01)
(52) U.S. Cl.
  CPC ......... *Y10T 152/10765* (2013.01); *Y10S 57/902* (2013.01)

(56) References Cited

U.S. PATENT DOCUMENTS

| | | | | |
|---|---|---|---|---|
| 5,375,404 | A | * 12/1994 | Conway | ............ 57/212 |
| 5,461,850 | A | * 10/1995 | Bruyneel et al. | ............ 57/212 |
| 6,237,663 | B1 | 5/2001 | Cipparrone et al. | |
| 6,863,103 | B1 | 3/2005 | Masubuchi et al. | |
| 2003/0178117 | A1 | 9/2003 | Oosawa et al. | |

FOREIGN PATENT DOCUMENTS

| | | | |
|---|---|---|---|
| JP | 04-018182 | A | 1/1992 |
| JP | 04-018183 | A | 1/1992 |
| JP | 6-173179 | * | 6/1994 |
| JP | 7-2629 | U | 1/1995 |
| JP | 2000-192379 | A | 7/2000 |
| JP | 2002-30586 | A | 1/2002 |
| JP | 2005-314833 | A | 11/2005 |
| JP | 2006-22440 | A | 1/2006 |
| JP | 2006-104636 | * | 4/2006 |
| JP | 2006-214062 | A | 8/2006 |
| JP | 2008-150757 | A | 7/2008 |
| JP | 2008-285785 | A | 11/2008 |

OTHER PUBLICATIONS

International Search Report PCT/JP2009/050568 dated Feb. 16, 2010.
Anonymous: High Tensile Strength Steel Cord Constructions for Tyres, Research Disclosure, Mason Publications, Hampshire, GB, vol. 340, No. 54, (Aug. 1, 1992), XP007118007, ISSN: 0374-4353.
European Search Report dated Apr. 8, 2014 issued in corresponding EP application 10 731 335.5.
Chinese Office Action and Search Report issued in Chinese Application No. 201080004973.2 dated Mar. 21, 2013.

* cited by examiner

STEEL CORD FOR REINFORCING RUBBER ARTICLE AND PNEUMATIC TIRE

TECHNICAL FIELD

The present invention relates to a steel cord for reinforcing a rubber article and a pneumatic tire (hereinafter occasionally simply referred to as "tire"), more particularly relates to a steel cord for reinforcing a rubber article applicable favorably to a heavy duty tire to be mounted on a heavy vehicle, such as a transportation vehicle or a construction machine, and to the heavy duty tire.

BACKGROUND ART

A tire for a construction vehicle is mounted on a heavy dump truck, etc. to be utilized at a large scale civil construction site or an ore mine is subjected to harsh working conditions of a heavy load on rough ground surfaces. Since a tire for a construction vehicle destined for running over rough surfaces receives a strong force from a road surface as well as a heavy load by nature, high tensile strength (breaking force) is required for a steel cord to be used for respective reinforcing layers, such as a carcass and a belt.

Consequently, for such reinforcing layers, a steel cord with a so-called multi-twisted structure, such as a 7×(3+9) structure and a 7×(3+9+15) structure (for example, Patent Documents 1 and 2) and a (3+8+13+18) 4-layer-twisted structure (Patent Documents 3 and 4) in which a plurality of sheath strands formed by twisting a plurality of wires are twisted around a core strand formed by twisting a plurality of wires has been used broadly.

Further, a tire for a construction vehicle has high risks of being damaged as the result of incurring the high load on the rough ground surface, and such countermeasures have been taken, as use of a large diameter cord as a reinforcing cord, and use of a so-called high tensile strength steel to increase the tensile breaking force per unit area of the cord, so as to increase the tensile breaking strength in the axial direction of the cord.

RELATED ART DOCUMENTS

Patent Documents

Patent Document 1: Japanese Unexamined Patent Application Publication No. 2000-192379
Patent Document 2: Japanese Unexamined Patent Application Publication No. 2002-30586
Patent Document 3: Japanese Unexamined Patent Application Publication No. H04-18182
Patent Document 4: Japanese Unexamined Patent Application Publication No. H04-18183

SUMMARY OF THE INVENTION

Problems to be Solved by the Invention

A conventional steel cord as a reinforcing material for a heavy duty tire has not been very satisfactory under circumstances as described below. More particularly, belt plies, especially the innermost belt ply, of a heavy duty tire forced to run on rough surfaces, is bent widely, when it treads on a relatively obtuse projection, and it has been often observed that a steel cord for reinforcement is led to premature cord breakage by a tensile force in the axial direction of the cord. Meanwhile, when it treads on a relatively sharply pointed projection, it is bent locally, and it has been often observed that cord breakage occurs by a shear force from the projection in a belt reinforcing ply closest to the tread surface.

From the above, for a steel cord to be utilized as a reinforcing material for a construction vehicle tire, both the tensile strength in the axial direction of the cord and the strength in the shearing direction are required. In case belt plies are thick, when they are bent by treading on a projection, an inner side belt cord, namely located on an outer side of a bend, undergoes easily a tensile force which leads to the breaking elongation. Consequently, the belt ply is required to be as thin as possible.

Under such circumstances, an object of the present invention is to provide a steel cord for reinforcing a rubber article, which improves cut resistant property, namely durability against cut, such as a notch and a perforation, in the case of treading on an obtusely or sharply pointed projection, without decreasing the strength in the axial direction of the cord, and without increasing the thickness in the radial direction, namely without increasing the weight of a tire, as well as a construction vehicle tire utilizing the steel cord for reinforcing a rubber article as a reinforcing material.

Means for Solving the Problems

For attaining the object, the present inventor has intensively studied a 4-layer-twisted steel cord which conventionally has a drawback in that the manufacturing facility thereof becomes huge to find out that the above problems can be solved, thereby completing the present invention.

More particularly, the steel cord for reinforcing a rubber article according to the present invention is a steel cord for reinforcing a rubber article formed by twisting a plurality of sheath strands formed by twisting a plurality of wires around a core strand formed by twisting a plurality of wires, wherein
the core strand is constituted of a 4-layer-twisted structure and the diameter of the steel cord is 5 mm or larger.

In the present invention, it is preferable that the sheath strand is constituted of at least 2-layer-twisted structure with core wires and sheath wires twisted, and the number of the sheath strands is preferably 6 to 10.

The pneumatic tire according to the present invention is a pneumatic tire having a carcass as a skeletal structure comprising ply(s) of radially oriented cords bridging a left-and-right pair of beads and extending toroidally, a belt located on the outer side in the radial direction of the tire at a crown part of the carcass, and the belt comprises 6 belt plies each with arrayed cords, which are crossed between the laminated plies, wherein
the cord constituting the third belt ply and the fourth belt ply of the belt is a steel cord for reinforcing a rubber article according to the present invention.

Effects of the Invention

By the present invention, without decreasing the strength in the axial direction of the cord, and without increasing the thickness in the radial direction, a steel cord for reinforcing a rubber article, which improves durability against cut, as well as a construction vehicle tire utilizing the steel cord for reinforcing a rubber article as a reinforcing material can be provided.

MODES FOR CARRYING OUT THE INVENTION

An embodiment of the present invention will be described more specifically below.

Figure 1:
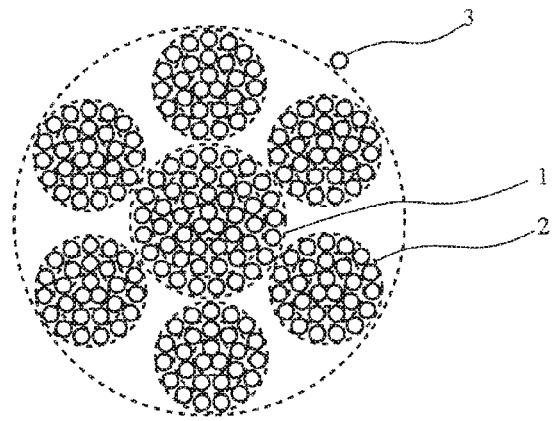
FIG. 1 is a cross-sectional view of a steel cord according to the present invention.

In the case of a preferred embodiment of a steel cord according to the present invention shown in FIG. 1, six sheath strands 2 are twisted around a core strand 1. Further, on the outer circumference of the cord a wrapping wire 3 is coiled spirally along the cord circumference.

In the present invention, it is essential that the core strand 1 is constituted of a 4-layer-twisted structure. When a cord according to the present invention is applied to a tire as a reinforcing material,
by making the core strand 1 a 4-layer-twisted structure, the shear resistance and cut resistant property against a shear force in the case of treading on a relatively sharply pointed projection can be secured, as well as the increase of the weight of a tire can be suppressed. When the number of the layers of the core strand 1 is less than 4, since the amount of steel per unit cross section is small, the tensile strength may not be attained sufficiently. Therefore, a sufficient strength is not exerted against a flexural tensile input in the case of treading on an obtusely pointed projection, so that the cut resistance property decreases and the shear resistance decreases. On the other hand, When the number of the layers of the core strand 1 is more than 4, the weight of the tire increases. The illustrated example represents a 3+9+15+21 twisted structure. In the present invention, the sheath strand 2 is preferably constituted of at least 2-layer-twisted structure with core wires and sheath wires twisted. The illustrated example represents a 3+9+15 3-layer-twisted structure.

In the present invention, it is also essential that the core strand 1 has a 4-layer-twisted structure, the diameter of the core strand is large, and the diameter of the steel cord is 5 mm or larger. When the diameter of the steel cord is less than 5 mm, in the case of using a steel cord according to the present invention as a reinforcing material for a tire, a strength cannot be secured and the improvement of the cut resistant property cannot be expected. The shear resistance cannot be obtained sufficiently either. From the viewpoint that the above-mentioned effects are favorably secured and that the thickness of the belt plies is not increased, the diameter of the steel cord is preferably 5 to 8 mm.

In the present invention, the number of the sheath strands is preferably 6 to 10. When the number of the sheath strands wound around the core strand is less than 6, a favorable tensile strength with respect to the cord cross section may not be attained. On the other hand, when the number of windings of the sheath strands is 11 or more, the sheath strand becomes thin, and as the result, the diameter of the wires constituting the sheath strand becomes extremely thin, so that premature breakage of the wires constituting the sheath strand due to a flexural tensile input in the case of treading on an obtusely pointed projection occurs, which makes it difficult to obtain a sufficient cut resistance property.

Figure 2:
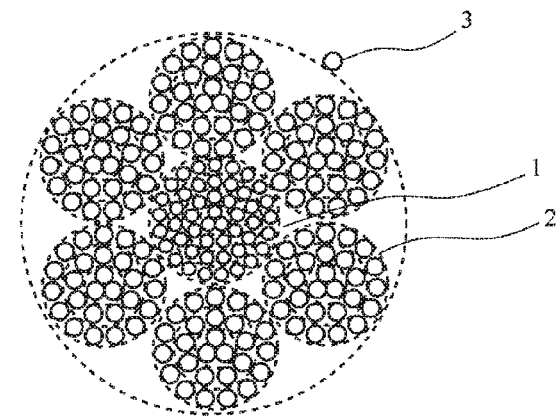
FIG. 2 is a cross-sectional view of a steel cord in Example 1.

Another preferred embodiment of a steel cord according to the present invention is shown in FIG. 2. In this steel cord, the core strand 1 has a 3+9+15+21 4-layer-twisted structure. Six sheath strands 2 twisted around the core strand 1 have a 3+9+15 3-layer-twisted structure. In the illustrated embodiment, the diameter of the wires constituting the core strand is smaller than the diameter of the wires constituting the sheath strand.

Figure 3:
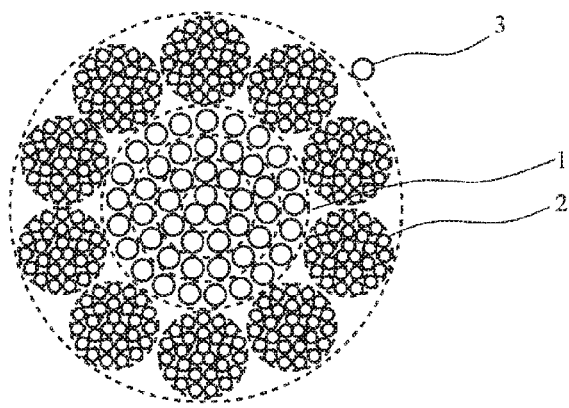
FIG. 3 is a cross-sectional view of a steel cord in Example 2.
Figure 4:
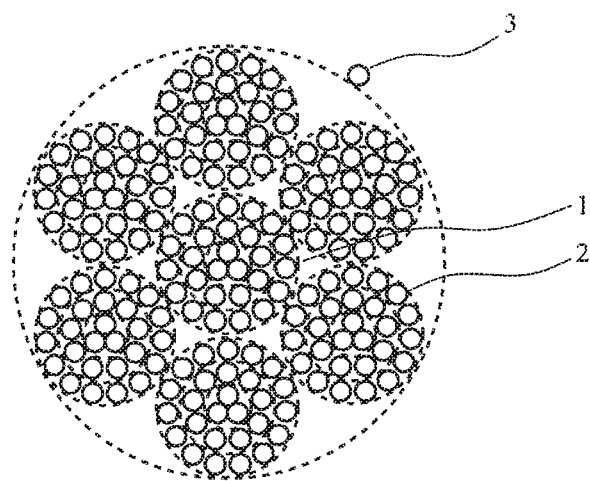
FIG. 4 is a cross-sectional view of a steel cord in Conventional Example 2.
Figure 5:
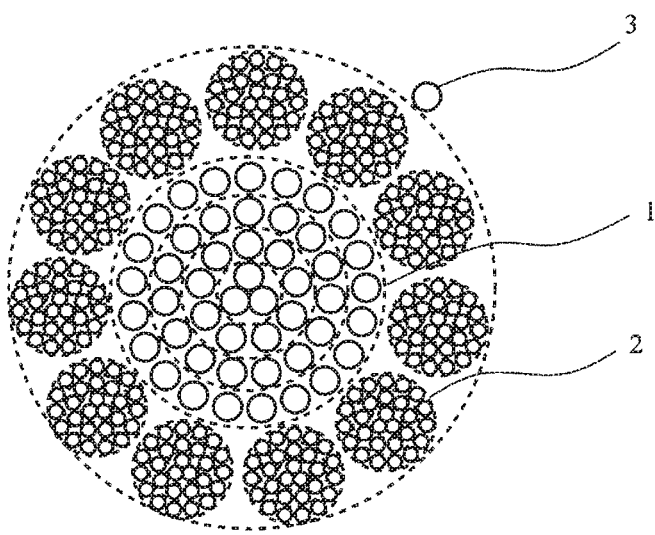
FIG. 5 is a cross-sectional view of a steel cord in Example 3.
Figure 6:
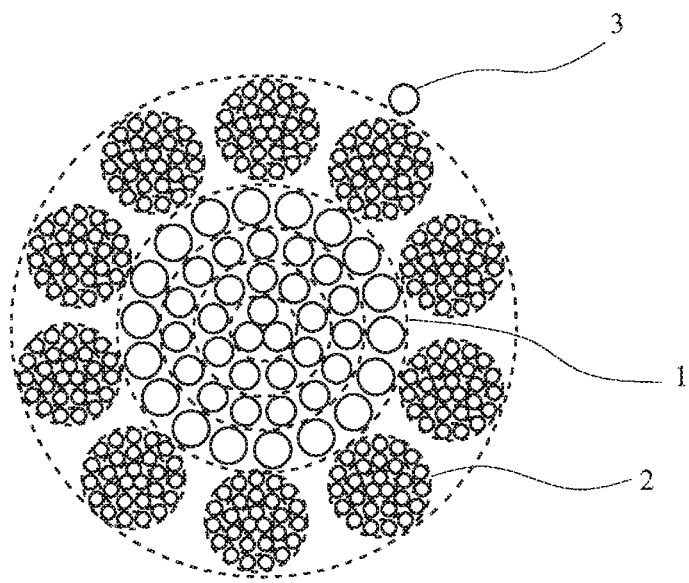
FIG. 6 is a cross-sectional view of a steel cord in Example 4.

Another preferred embodiment of a steel cord according to the present invention is further shown in FIG. 3. In this steel cord, the core strand 1 has a 3+9+15+21 4-layer-twisted structure. Ten sheath strands 2 twisted around the core strand 1 have a 3+9+15 3-layer-twisted structure.

In the present invention, the core strands and the sheath strands have a same direction twisted structure in order to avoid breakage due to the concentration of stress by line contact in the individual strands.

Further, it is preferable according to the present invention to use a high tensile strength steel with the carbon content of 0.80 to 1.00% by mass for the wires used to secure the strength of the rubber article. In order to suppress distortion of the cord and to secure good factory workability, a wrapping wire 3 should preferably be wound around the circumference of the cord.

Further with respect to the wires constituting the respective strands, the wire diameters should be preferably in a range of 0.20 to 0.60 mm. In case the diameters of the respective wires are less than 0.20 mm, the steel cord cannot attain sufficient tensile strength, and in case they exceed 0.60 mm, when the cord is applied to a tire, the surface strain of the wires in the steel cord at a contact area of the tire increases so as to decrease the resistance to fatigue, which is undesirable. In order to increase productivity, it is preferred that wires used for the core strands and sheath strands have the same diameters respectively.

Figure 7:
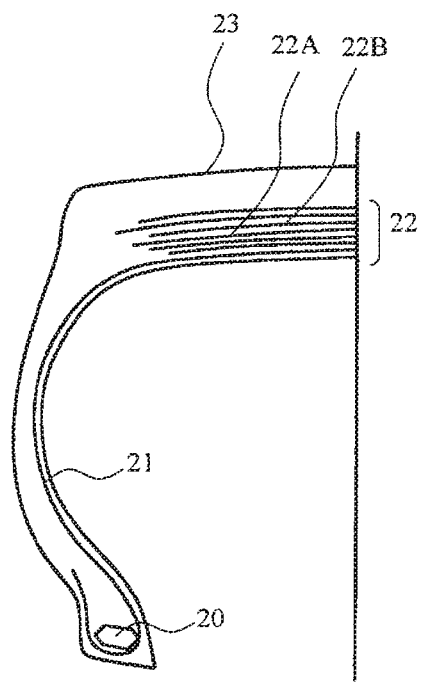
FIG. 7 is a cross-sectional view of a tire for a construction vehicle according to one example of the present invention.

As a preferred example of a tire according to the present invention, to which a steel cord according to the present invention is applied as a reinforcing material for the belt, can be presented a construction vehicle tire shown in FIG. 7. The construction vehicle tire is provided with a carcass 21 constituted with a ply of steel cords extending in the radial direction between a pair of bead cores 20, a belt 22 constituted with 6 belt plies with cords arrayed on the outer side in the radial direction of the tire at a crown part of the carcass 21, which are crossed between the laminated plies, and a tread 23 located outer side in the tire diametral direction of the belt 22.

The first belt ply and the second belt ply of the belt constituted with 6 plies are provided in the order mentioned for the purpose of preventing an expansion in the radial direction of the tire; the third belt ply and the fourth belt ply for the purpose of preventing breakage of a tire due to a large cut; and the fifth belt ply and the sixth belt ply for the purpose of preventing corrosion of the cords due to a small cut.

In the tire according to the present invention, cords constituting the third belt ply 22A and the fourth belt ply 22B among the belt plies constituting the belt 22 are steel cords for reinforcing a rubber article according to the present invention. By this means the cut resistant property in the case of treading on an obtusely or sharply pointed projection can be improved without decreasing the strength in the axial direction of the tire cord, and without increasing the tire weight.

EXAMPLES

The present invention will be described below by way of Examples.

Examples 1 to 4, Conventional Examples 1 and 2, and Comparative Example

Various steel cords shown in Table 1 below were produced. The respective cross-sectional structures perpendicular to the cord axes of the steel cords are shown in FIGS. 2 to 6. FIG. 2 corresponds to Example 1, FIG. 3 to Example 2, FIG. 4 to Conventional Example 2, FIG. 5 to Example 3, and FIG. 6 to Example 4, respectively. The wires used for the steel cords utilized a high tensile strength steel with the carbon content of 0.82% by mass. The following evaluation tests were conducted on the steel cords.

(Shear Resistance)

The resistance to shear failure of a sample steel cord was evaluated by a Charpy impact tester. The results were expressed by indices based on the steel cord according to Conventional Example 1 as 100. The higher value means the better result.

(Tire Weight)

The sample steel cord was applied to the third belt ply and the fourth belt ply of a construction vehicle tire under a condition of the same size of 53R63 as a reinforcing material and the weight was measured. The results were expressed by indices based on the tire according to Conventional Example 1 as 100. The lower value means the better result.

(Number of Cuts Incurred)

The sample steel cord was applied to the third belt ply and the fourth belt ply of a construction vehicle tire of the size of 53R63 as a reinforcing material. The respective tires were so designed that the weights of the steel cords were identical. The respective tires were seated on the standard rim according to the JATMA standards, and mounted on a construction vehicle, which traveled at the average vehicle speed of 40 km/h for 1000 hours. Thereafter the number of cuts having reached the ply utilizing the steel cord was counted in the section equivalent to 1/5 of the circumferential length of each tire. The obtained results are shown also in Table 1.

TABLE 1

| | | Conventional Example 1 | Conventional Example 2 | Example 1 | Example 2 | Comparative Example | Example 3 | Example 4 |
|---|---|---|---|---|---|---|---|---|
| Cord structure of core strand and sheath strand | | 1 + 6 | 1 + 6 | 1 + 6 | 1 + 10 | 1 + 6 | 1 + 11 | 1 + 10 |
| Core strand | Structure | 3 + 9 | 3 + 9 + 15 | 3 + 9 + 15 + 21 | 3 + 9 + 15 + 21 | 3 + 9 + 15 + 21 | 3 + 9 + 15 + 21 | 3 + 9 + 15 + 18 |
| | Core Wire diameter (mm) | 0.44 | 0.30 | 0.22 | 0.35 | 0.17 | 0.37 | 0.52 |
| | First Sheath Wire diameter (mm) | 0.44 | 0.30 | 0.22 | 0.35 | 0.17 | 0.37 | 0.52 |
| | Second Sheath Wire diameter (mm) | — | 0.30 | 0.22 | 0.35 | 0.17 | 0.37 | 0.52 |
| | Third Sheath Wire diameter (mm) | — | — | 0.22 | 0.35 | 0.17 | 0.37 | 0.60 |
| | diameter (mm) | 1.83 | 1.85 | 1.79 | 2.85 | 1.39 | 3.02 | 4.40 |
| Sheath strand | Structure | 3 + 9 | 3 + 9 + 15 | 3 + 9 + 15 | 3 + 9 + 15 | 3 + 9 + 15 | 3 + 9 + 15 | 3 + 9 + 15 |
| | Core Wire diameter (mm) | 0.44 | 0.30 | 0.30 | 0.21 | 0.23 | 0.20 | 0.32 |
| | First Sheath Wire diameter (mm) | 0.44 | 0.30 | 0.30 | 0.21 | 0.23 | 0.20 | 0.32 |
| | Second Sheath Wire diameter (mm) | — | 0.30 | 0.30 | 0.21 | 0.23 | 0.20 | 0.32 |
| Cord | Cord diameter (mm) | 5.23 | 5.23 | 5.23 | 5.23 | 4.00 | 5.23 | 8.00 |
| Steel amount per cross section (Index) | | 100 | 102 | 104 | 111 | 60 | 112 | 250 |
| Shear resistance (Index) | | 100 | 101 | 111 | 115 | 80 | 103 | 130 |
| Tire weight (Index) | | 100.0 | 100.1 | 100.3 | 101.0 | 92.0 | 101.1 | 108 |
| Number of cuts incurred | | 15 | 15 | 7 | 6 | 20 | 10 | 3 |

It is obvious from the evaluation results in Table 1 that the shear resistance was improved and the number of cuts incurred was decreased without increasing the tire weight in any of Examples 1 to 4.

DESCRIPTION OF SYMBOLS

1 Core strand
2 Sheath strand
3 Wrapping wire
20 Bead core
21 Carcass
22 Belt
22A Third belt ply
22B Fourth belt ply
23 Tread

The invention claimed is:

1. A steel cord for reinforcing a rubber article formed by twisting a plurality of sheath strands formed by twisting a plurality of wires around a core strand formed by twisting a plurality of wires, wherein
    the core strand is constituted of a 4-layer-twisted structure and the diameter of the steel cord is 5 mm or larger, the core strand and the sheath strands have a same direction twisted structure, all of the core filaments have a smaller diameter than all of the sheath filaments, and only one layer consisting of the sheath strands are twisted around the core strand, and the sheath strands are constituted of a 2-layer-twisted structure with core wires and sheath wires twisted.

2. The steel cord for reinforcing a rubber article according to claim 1, wherein the number of the sheath strands is preferably 6 to 10.

3. The pneumatic tire having a carcass as a skeletal structure comprising ply(s) of radially oriented cords bridging a left-and-right pair of beads and extending toroidally, a belt located on the outer side in the radial direction of the tire at a crown part of the carcass, and the belt comprises 6 belt plies each with arrayed cords, which are crossed between the laminated plies, wherein
    the cord constituting the third belt ply and the fourth belt ply of the belt is a steel cord for reinforcing a rubber article according to claim 1.

* * * * *